United States Patent [19]

Sou

[11] 4,319,545
[45] Mar. 16, 1982

[54] SECTIONAL PET CAGE

[76] Inventor: Teho Sou, 7-18 Higashiimazato 2-chome, Higashinari-ku Osaka, Japan

[21] Appl. No.: 220,131

[22] Filed: Dec. 24, 1980

Related U.S. Application Data

[63] Continuation of Ser. No. 31,079, Apr. 18, 1979, abandoned.

[30] Foreign Application Priority Data

Apr. 24, 1978 [JP] Japan .................................. 53/54858
Oct. 5, 1978 [JP] Japan .................................. 53/137613
Oct. 5, 1978 [JP] Japan .................................. 53/137614

[51] Int. Cl.³ ............................................. A01K 31/06
[52] U.S. Cl. ..................................................... 119/17
[58] Field of Search .................................. 119/17–19, 119/23

[56] References Cited

U.S. PATENT DOCUMENTS 1,656,282  1/1928  Leon ....................................... 119/17
3,381,664  5/1968  Barlocci ................................. 119/17

FOREIGN PATENT DOCUMENTS 1337906  8/1963  France ................................... 119/17
572702   2/1976  Switzerland .......................... 119/17

Primary Examiner—Jay N. Eskovitz
Attorney, Agent, or Firm—Trexler, Bushnell & Wolters, Ltd.

[57] ABSTRACT

A sectional pet cage for keeping small animals therein. The pet cage comprises a sectional frame including a back plate, a pair of side plates, and a top plate which are detachably connected with each other to form the rigid frame, a covering wire net which is simultaneously incorporated into the frame so as to cover the upper and the front portions of the frame, thereby forming an enclosure therein, a base dish and a base wire net slidably supported by the side plates therebetween at the lower portion of the frame, and a shutter plate which is vertically movably supported by the side plates therebetween, engaging at the front end with a vertically slidable lid for an window of the covering net, thereby keeping the window closed when the lid is by chance drawn up, and engaging at the lower end with the base dish, thereby serving as stops therefor.

7 Claims, 7 Drawing Figures

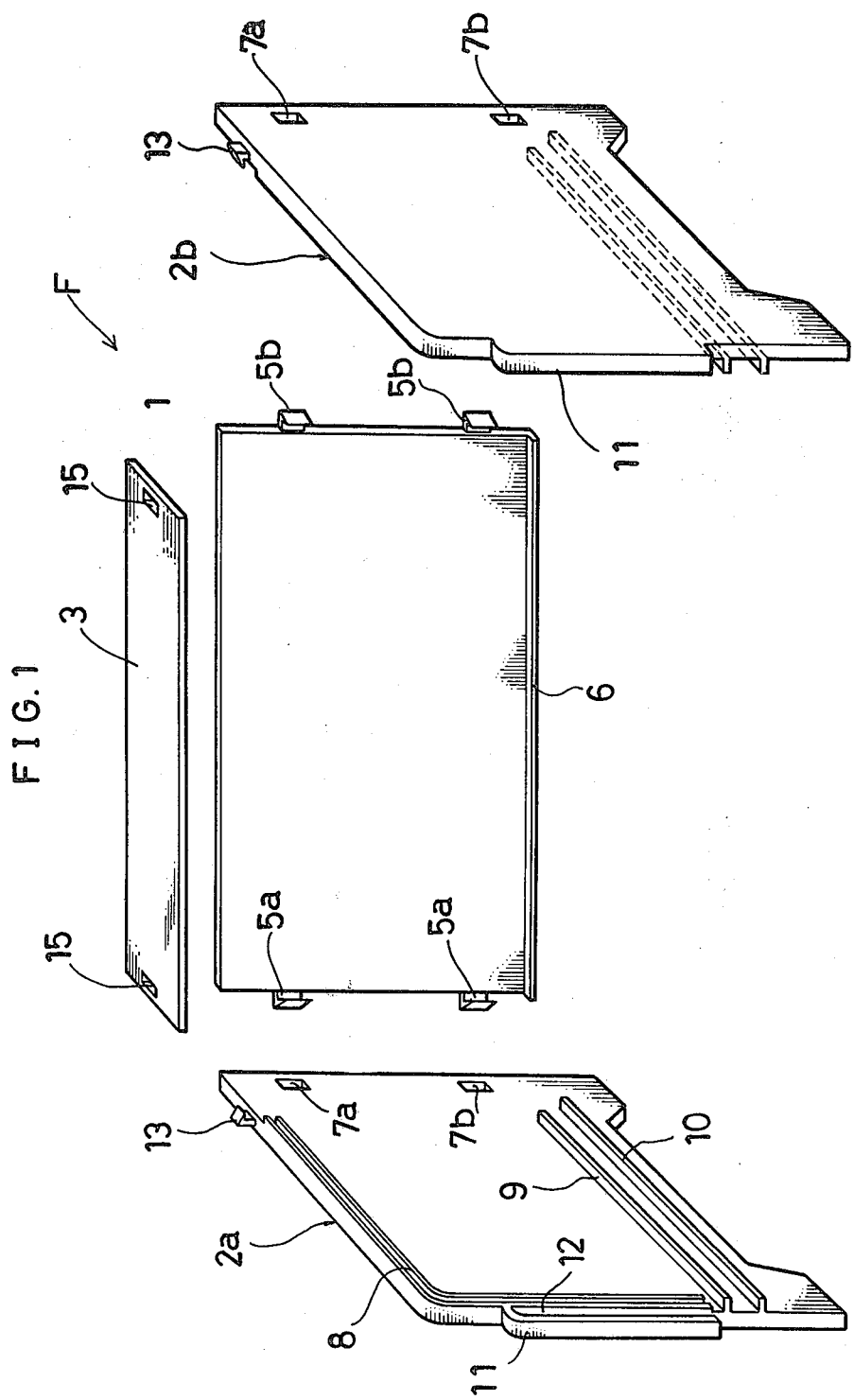

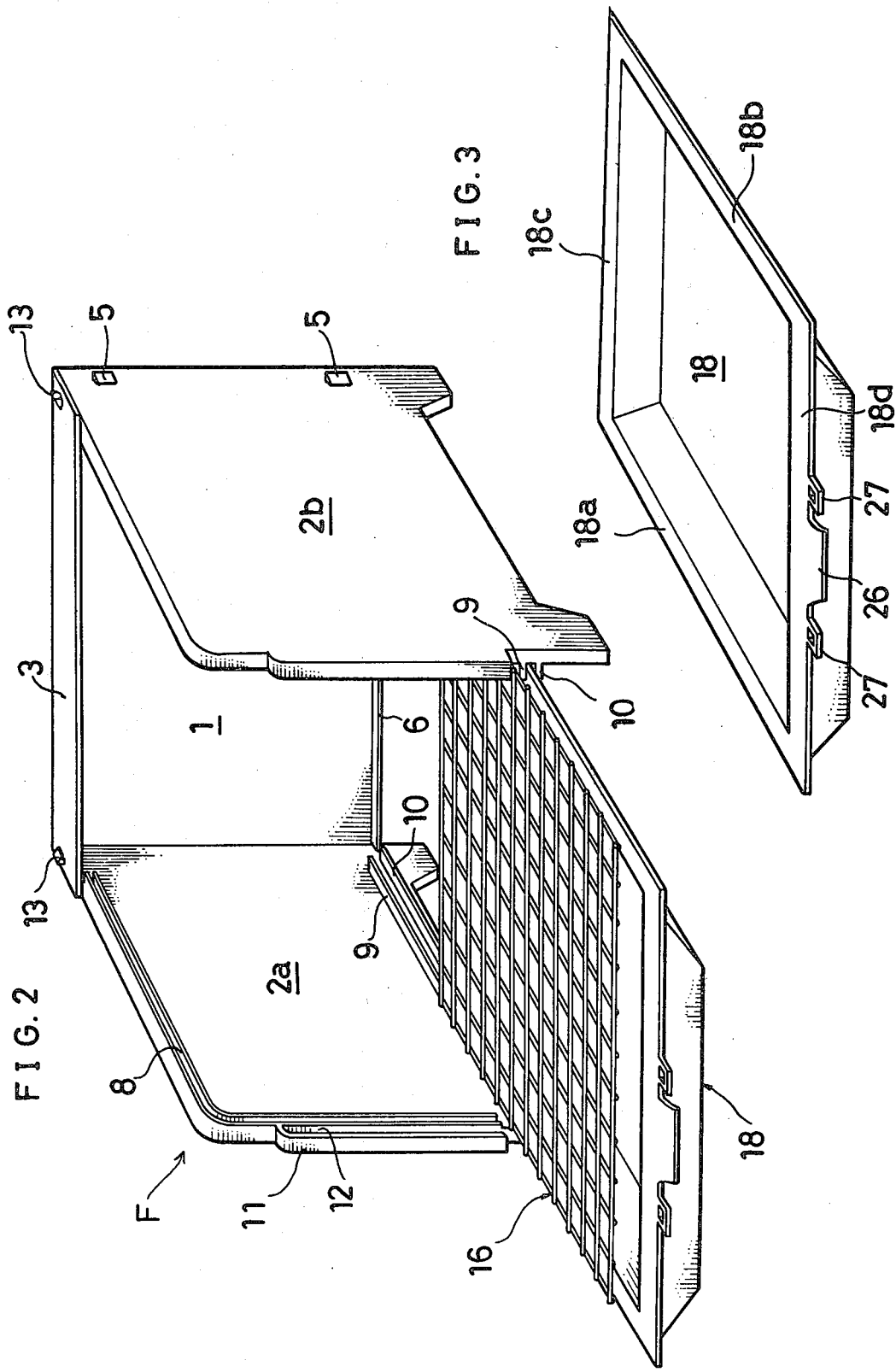

SECTIONAL PET CAGE

This application is a continuation of application Ser. No. 31,079, filed 4/18/79 and now abandoned.

The present invention relates to a sectional pet cage for keeping small animals therein such as birds, mice and squirrels.

A conventional pet cage includes a rigid frame having a wire net connected therewith to form an enclosure therein. Therefore, the conventional pet cage cannot be disassembled nor assembled when necessary, and furthermore, the cage is very voluminous when packaged, thus resulting in a high transportation cost.

It is, therefore, an object of the present invention to provide a sectional pet cage which can be readily assembled and disassembled when necessary, and also which is very compact when disassembled.

Other objects and features of the invention will be apparent from the following description taken in connection with the accompanying drawings, in which:

FIG. 1 is a perspective view of a frame of a pet cage in sections according to the present invention;

FIG. 2 is a perspective view of the assembled frame having a base wire net and a base dish provided therewith;

FIG. 3 is a perspective view of the base dish of the sectional pet cage of the invention;

Figure 4:
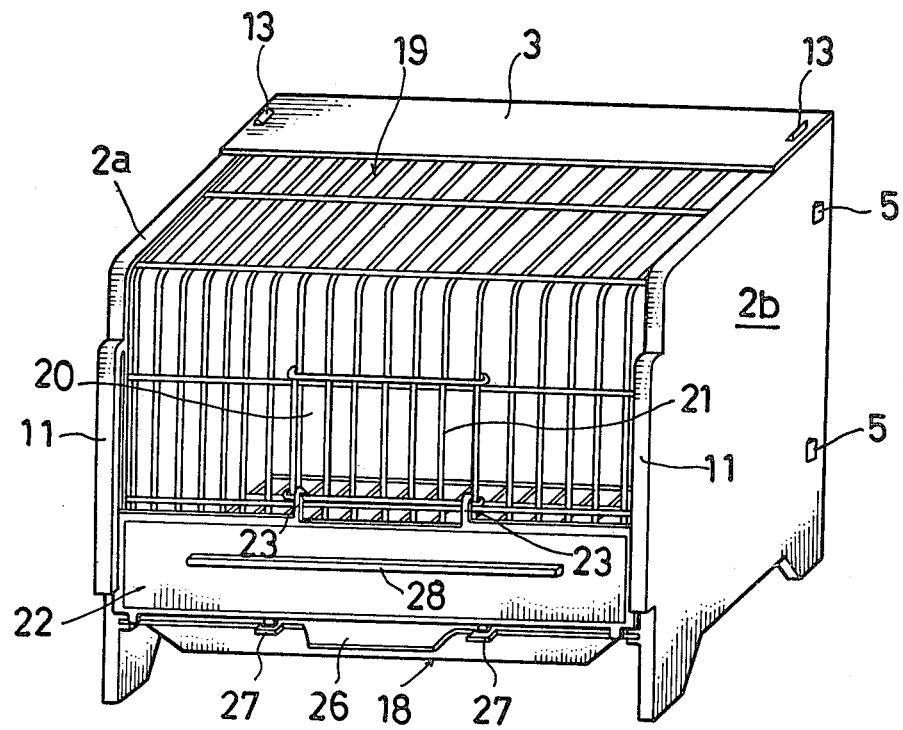
FIG. 4 is a perspective view of the assembled pet cage of the invention.

Now referring first to FIG. 1, there is illustrated a frame F in sections of a pet cage of the invention. The frame comprises a back plate 1, a pair of side plates 2a, 2b, and a top plate 3.

The back plate has two projecting hook-like inserts 5a at an interval on one of the vertical edges thereof, and another pair on the other edge. The back plate further has a flange 6 projecting inward and extending along the lower edge thereof. The each side plate 2 has near the rear end thereof a pair of openings 7a, 7b into which the inserts 5a, 5b are to be inserted, respectively, for detachably connecting the side plates with the back plate on assembling the frame F. The each side plate further has a curved groove 8 along the upper edge and the front edge on the inner face thereof, a pair of guides, i.e., an upper or first guide 9 and a lower or second guide 10, extending horizontally and parallel to each other along the lower edge on the inner face thereof, and a slit 12 extending vertically on the front portion of the side plate. The slit may be provided on the inner face of an extension 11 protruded from the front end of the side plate. The each side plate also has a hook-like insert 13 mounted on the rear portion of the upper edge thereof.

The above inserts 5, 13 all are preferably of a resilient synthetic resin or rubber, and more preferably, the inserts are formed integrally with the plates.

The top plate 3 has a pair of openings 15 on the opposite ends for receiving the inserts 13 thereinto to connect detachably the side plate therewith on assembling the frame.

Now, the frame F is assembled, as is shown in FIG. 2, for example, by inserting the inserts 5 of the back plate 1 into the corresponding openings 7 on the side plates 2, and then by inserting the inserts 13 on the side plates into the corresponding openings 15 on the top plate 3. The engagement of the hook-like inserts of a resilient synthetic resin or rubber with the corresponding openings fixes all the plates at predetermined positions. The top plate keeps the side plates at right angles to the back plate.

In FIG. 2 is shown a base wire net 16. The base net is supported by putting the side edges thereof on the upper guides on the inner faces of the side plates 2, and preferably by putting the rear edge of the net on the flange 6 on the back plate 1. Thus, the base net 16 is supported by the frame in such a manner that the net can be drawn out from the frame when necessary.

The sectional pet cage of the invention includes a base dish 18 which is detachably provided under the base net 16. FIG. 3 illustrates the dish 18 in more detail. Flanges 18 are provided on the upper edge of the dish. On assembling and disassembling the pet cage according to the invention, the dish is slid into and out from the frame with the side flanges 18a, 18b on the lower guides 10. The front flange 18d has a pair of openings 27 thereon at an interval, and preferably a pull 26 at the front end for pulling out the dish from the frame.

FIG. 4 shows the thus assembled pet cage according to the invention, in which a covering wire net 19 covers the upper and the front portions of the frame F, thus forming an enclosure therein. The covering net is supported by the side plates 2 by engaging the side edges thereof with the curved grooves 8 on the inner faces of the side plates simultaneously when assembling the frame.

According to the present invention, therefore, the base dish is supported by the side plates, and there is no need of a base plate for supporting the dish. The conventional pet cage, on the contrary, has a base plate as an indispensable part. Thus, animal excrement soils the base plate as well as the base dish, and makes the cleaning thereof very troublesome. The pet cage of the invention saves a keeper trouble of this sort.

The covering net 19 has at its front portion a square or oblong window 20 for getting an animal in and out from the cage, and a lid 21 of wire net which normally covers the window. The lid is so engaged with the window as to be vertically movable. The lid is drawn up to open the window.

Figure 5:
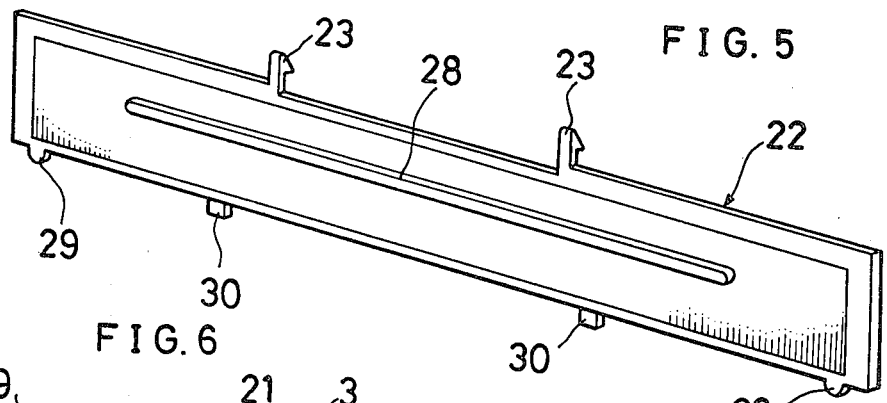
FIG. 5 is a perspective view of a shutter plate of the pet cage of the invention.

A movable shutter plate 22 is supported by inserting the side edges thereof into the slits 12 extending vertically along the front edge of the side plates 2 so as to normally cover the lower portion of the covering net 19. As is shown in more detail in FIG. 5, the shutter plate is a plate of a relatively small width, and has on the upper edge thereof a pair of hook-like projections 23 at an interval. These projections engage with the lower end of the lid 21 so that the shutter plate acts as an weight for the lid after the pet cage has been assembled.

The shutter plate further has a pair of projections 29 at the opposite ends of the upper edge, and another pair of projections 30 at an interval inside the outer projections 29. The inside projections 30 are inserted into the corresponding openings 27 on the dish 18, thus serving as stops for the dish. In turn, the outside projections 29 abut the front edge of the dish, also serving as stops. An elongated projection 28 is preferably mounted on the front face of the shutter plate for a pull thereof.

Figure 6:
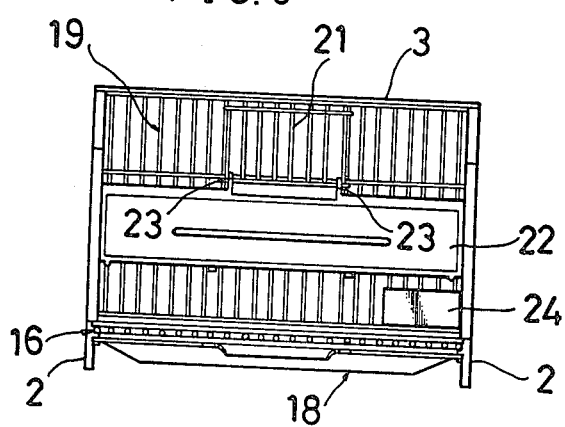
FIG. 6 is a front view of the assembled pet cage of the invention wherein a net lid is drawn up together with the shutter plate.

The shutter plate 22 is not fixed securely onto the dish, however, and is movable vertically along the front ends of the side plates 2 with the side edges thereof engaging with the slits 12. Since the shutter plate is also engaged with the lid 21, as is previously described, the shutter plate is drawn up together with the lid when the lid is drawn up. Thus, the shutter plate prevents the window from opening by chance. Furthermore, as is shown in FIG. 6, even when an animal in the cage succeed in pushing up the lid, the shutter plate will still cover the window, thereby keeping the window closed. The engagement of the projections 30 with the corresponding openings 27 on the dish 18, in turn, prevents the shutter plate from bending outwardly to be detached from the frame when an animal in the cage pushes the covering net 19. On the other hand, when a keeper wishes to open the window, the shutter plate is at first disengaged with the lid, and then the lid is pulled up.

The covering net 19 has another small window at a corner for putting a feed 24 in the cage therethrough, as is also shown in FIG. 6. Since the shutter plate normally covers the lower portion of the covering net, the feed cannot be pushed out of the cage even when an animal in the cage tries to do so.

Figure 7:
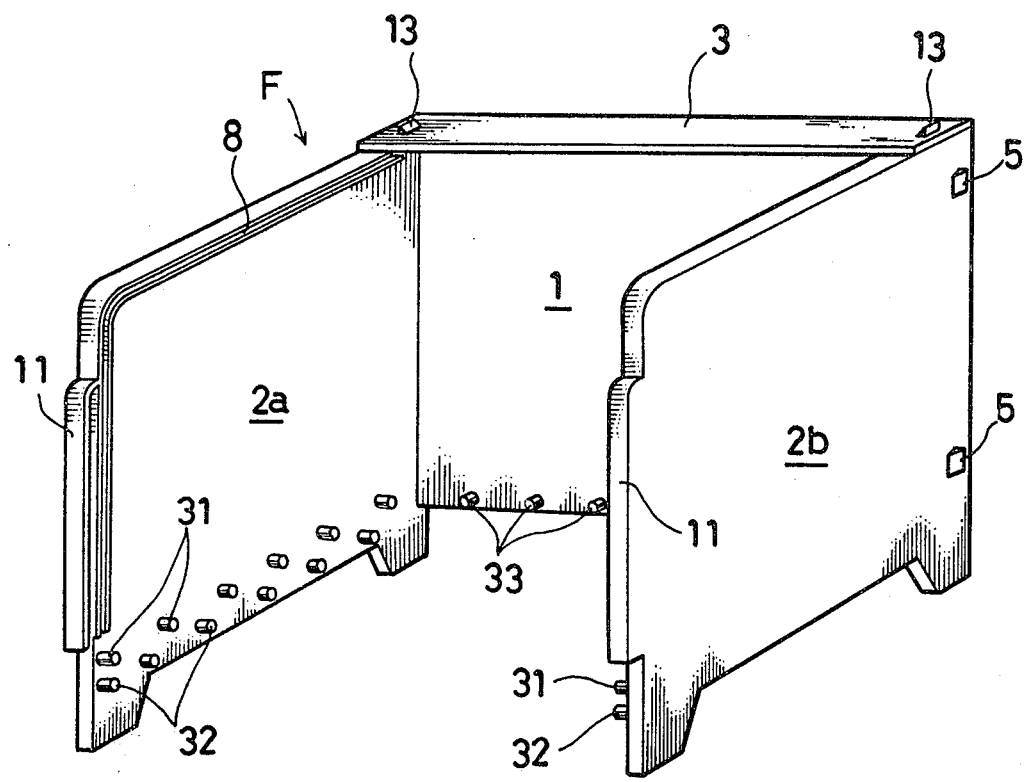
FIG. 7 is a perspective view of another embodiment of the frame of the sectional pet cage according to the invention.

FIG. 7 illustrates another embodiment of the frame of the sectional pet cage of the invention, in which a plurality of projections 31, 32 are mounted in two lines parallel to each other in place of the first and the second guides 9, 10, respectively, along the lower edges on the inner faces of the side plates 2. It will be readily understood that these projections in a line serve as a guide for the base net 16 or a guide for the dish 18. Similarly, the flange 6 on the back plate 1 may be replaced by a plurality of projections 33 in a line for supporting the rear edge of the base net.

While the invention has been particularly shown and described with reference to the preferred embodiments thereof, it will be also understood by those skilled in the art that the foregoing and other changes in form and details can be made therein without departing the spirit of the invention.

What is claimed is:

1. A sectional pet cage which comprises: a frame having a pair of side plates and a back plate having means at each of the side edges thereof detachably connected with the side plates;
   a covering wire net engageable with the side plates and supported thereby to cover the upper portion and the front portion of the frame, thereby forming an enclosure therein;
   a curved groove along an upper and front edge of an inner face of each of the side plates for engaging side edges of the covering wire net;
   a top plate detachably connected with the back plate and the side plates so as to fix the plates at a fixed position to each other; and
   a base dish slidably supported by the side plates under the frame.

2. A sectional pet cage as claimed in claim 1 wherein the each side plate has on the inner face thereof a guide extending horizontally along the lower edge thereof for thereon supporting slidably a base dish.

3. A sectional pet cage as claimed in claim 2 wherein the each side plate has on the inner face thereof another guide parallel to the guide for the base dish for thereon supporting slidably a base net above the base dish.

4. A sectional pet cage as claimed in claim 1 further including a shutter plate vertically slidably supported by the side plates so as to cover the lower front portion of the covering net.

5. A sectional pet cage as claimed in claim 4 wherein the shutter plate is supported by the side plates through the engagement of the side edges of the shutter plate with slits provided along the front ends of the side plates.

6. A sectional pet cage as claimed in claim 4 or claim 5 wherein the base dish is engaged at the front portion thereof with the shutter plate so that the shutter plate serves as stops for the base dish.

7. A sectional pet cage which comprises:
   a frame having a pair of side plates and a back plate;
   a covering wire net engageable with the side plates and supported thereby to cover the upper portion and the front portion of the frame, thereby forming an enclosure therein;
   a shutter plate vertically slidably supported by the side plates so as to cover the lower front portion of the covering net; and
   wherein the covering net has a window and a lid vertically slidably engaged with the window, and the shutter plate is detachably engaged with the lower end of the lid so as to keep the window closed when the lid is drawn up.

* * * * *